United States Patent
McNicholas et al.

(10) Patent No.: US 11,630,637 B2
(45) Date of Patent: Apr. 18, 2023

(54) PORTABLE SPEAKER WITH ORIENTATION-DEPENDENT EQUALIZATION

(71) Applicant: Bose Corporation, Framingham, MA (US)

(72) Inventors: Kyle Brian McNicholas, Somerville, MA (US); Nabin Sagar Sharma, Shrewsbury, MA (US); Michael Stephen Danielson, Wrentham, MA (US); Paul Larsen, Medford, MA (US); Rebecca Kowalczyk, Ashland, MA (US); Meir Mechtinger, Ashland, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/465,813

(22) Filed: Sep. 2, 2021

(65) Prior Publication Data

US 2023/0061241 A1  Mar. 2, 2023
US 2023/0061241 A1  Mar. 2, 2023

(51) Int. Cl.
*H04R 5/02* (2006.01)
*G06F 3/16* (2006.01)
*H04R 5/04* (2006.01)
*H04R 3/00* (2006.01)
*H04R 29/00* (2006.01)

(52) U.S. Cl.
CPC .............. *G06F 3/165* (2013.01); *H04R 3/00* (2013.01); *H04R 5/04* (2013.01); *H04R 29/001* (2013.01)

(58) Field of Classification Search
CPC .. G06F 3/165; H04R 3/00; H04R 5/04; H04R 29/001

USPC ........................................................ 381/300
See application file for complete search history.

(56) References Cited

U.S. PATENT DOCUMENTS

| | | | |
|---|---|---|---|
| 10,306,386 B2 | 5/2019 | Warden et al. | |
| 10,555,101 B2 | 2/2020 | Warden et al. | |
| 10,897,680 B2 | 1/2021 | Wodrich et al. | |
| 10,965,024 B2 | 3/2021 | Kallai et al. | |
| 2009/0167736 A1* | 7/2009 | Seydoux | G06F 3/147 345/589 |
| 2014/0314239 A1 | 10/2014 | Meyer et al. | |
| 2019/0230457 A1* | 7/2019 | Warden | H04R 1/025 |
| 2021/0296769 A1* | 9/2021 | Kallai | G06F 3/162 |

OTHER PUBLICATIONS

PCT International Search Report and Written Opinion for International Application No. PCT/US2022/039125, dated Nov. 4, 2022, 14 pages.

* cited by examiner

*Primary Examiner* — Ammar T Hamid
(74) *Attorney, Agent, or Firm* — Hoffman Warnick LLC

(57) ABSTRACT

Various aspects include portable speakers and methods of controlling such speakers. In a particular implementation, a portable loudspeaker includes: a controller configured to control an audio output according to at least two distinct equalization profiles and in at least two distinct physical orientations, where the controller is configured to switch between two of the distinct equalization profiles in response to detecting a change in physical orientation of the portable loudspeaker between two of the distinct physical orientations, where the switch between the two distinct equalization profiles is either: a) modified by a hysteresis factor, or b) smoothed according to a predefined pattern.

20 Claims, 6 Drawing Sheets

PORTABLE SPEAKER WITH ORIENTATION-DEPENDENT EQUALIZATION

TECHNICAL FIELD

This disclosure generally relates to controlling audio output in portable speakers. More particularly, the disclosure relates to approaches for controlling an audio output in a portable loudspeaker according to the physical orientation in the loudspeaker.

BACKGROUND

Portable loudspeakers provide flexibility for users to listen to audio while located in different environments, during travel, etc. Certain portable loudspeakers are configured for placement in a particular orientation to provide audio output, e.g., resting on a base and/or standing on a support leg or other structure. However, many conventional portable loudspeakers are not adaptable to provide a desired audio output while placed in distinct orientations.

SUMMARY

All examples and features mentioned below can be combined in any technically possible way.

Various aspects include portable loudspeakers and approaches for controlling audio output in portable loudspeakers. In certain aspects, a portable loudspeaker includes a controller configured to control audio output according to at least two distinct equalization profiles and in at least two distinct physical orientations. Equalization profiles can be switched in response to detecting a change in physical orientation of the portable loudspeaker between two of the physical orientations, and the switch can be either: a) modified by a hysteresis factor, or b) smoothed according to a predefined pattern.

In some particular aspects, a portable loudspeaker includes: a controller configured to control an audio output according to at least two distinct equalization profiles and in at least two distinct physical orientations, where the controller is configured to switch between two of the distinct equalization profiles in response to detecting a change in physical orientation of the portable loudspeaker between two of the distinct physical orientations, as modified by a hysteresis factor.

In additional particular aspects, a method of controlling an audio output at a portable loudspeaker configured to operate with at least two distinct equalization profiles in at least two distinct physical orientations includes: detecting a change in the physical orientation of the portable loudspeaker; and switching between two of the distinct equalization profiles in response to detecting the change in physical orientation of the portable loudspeaker, as modified by a hysteresis factor.

Implementations may include one of the following features, or any combination thereof.

In certain cases, the distinct equalization profiles include at least three equalization profiles.

In particular aspects, the loudspeaker further includes a transducer coupled with the controller for providing the audio output, and at least one orientation sensor coupled with the controller for indicating the physical orientation of the portable loudspeaker.

In certain cases, the orientation sensor is a single sensor. In certain additional cases, two or more sensors are used to indicate orientation. Example sensors include one or more of: an inertial measurement unit (IMU), an accelerometer, or an optical sensor.

In some implementations, the hysteresis factor includes a time delay between the detected change in physical orientation and the switch between two of the distinct equalization profiles.

In particular cases, the time delay is at least 100 milliseconds (ms). In some examples, the time delay is at least 110 ms, 120 ms, 130 ms, 140 ms, 150 ms, 160 ms, 170 ms, 180 ms, 190 ms or 200 ms.

In certain aspects, the portable loudspeaker is configured to provide the audio output in three distinct physical orientations according to two distinct equalization profiles.

In some implementations, the controller is configured to smooth a transition between the distinct equalization profiles according to a predefined pattern. In particular cases, the transition is smoothed using an exponential crossfade function, or a linear crossfade function. In particular examples, the crossfade duration is approximately 5 ms to approximately 35 ms, and in more particular examples is approximately 20 ms+/−5 ms to 10 ms.

In particular aspects, the controller is further configured to provide an indicator to a user of the switch between the distinct equalization profiles. In some examples, the indicator includes at least one of: ducking audio, providing a visual indicator at the speaker (e.g., lighting change and/or a tactile indicator such as a vibration), and/or an interface indicator such as on a connected device (e.g., smart device) or controller.

In certain cases, at least one of the equalization profiles includes a pairing profile configured for outputting audio while the portable loudspeaker is in a stereo pair of loudspeakers or a stereo grouping of loudspeakers.

In particular aspects, the pairing profile causes the controller to perform spectral matching with the portable loudspeaker and at least one additional loudspeaker in the stereo pair or the stereo grouping. In additional particular aspects, the pairing profile causes the controller to perform spectral matching with the portable loudspeaker and at least one additional loudspeaker in the stereo grouping, such as in a master speaker/worker speaker grouping.

In some implementations, the switch between two of the distinct equalization profiles produces a change in a perceptible radiation pattern of the audio output by a user.

In particular aspects, the controller is further configured to adjust an audio output limit based on the switch between two of the distinct equalization profiles. In certain cases, the audio output limit can be adjusted by selecting distinct limiter(s), tuning one or more limiters, or adjusting at least one limiter in a set, such as increasing a high pass limiter relative to a low pass limiter.

In some implementations, the portable loudspeaker has a single transducer.

In certain cases, the controller is configured to lock the equalization profile in response to a user command such that the equalization profile does not change in response to the detected change in physical orientation.

In some aspects, the controller is configured to initiate a demonstration mode by: prompting a user to modify the physical orientation of the portable loudspeaker; in a first mode: enabling the switching between two of the distinct equalization profiles in response to detecting the change in physical orientation; and in a second mode: disabling the switching between two of the distinct equalization profiles in response to detecting the change in physical orientation, such that a radiation pattern of the audio output differs sufficiently between the first mode and the second mode to be perceptible to the user.

In particular examples, user prompts can include a user interface (UI) prompt, e.g., a prompt via one or more of: a connected smart device, a portable loudspeaker interface, or a connected controller interface.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

Figure 1:
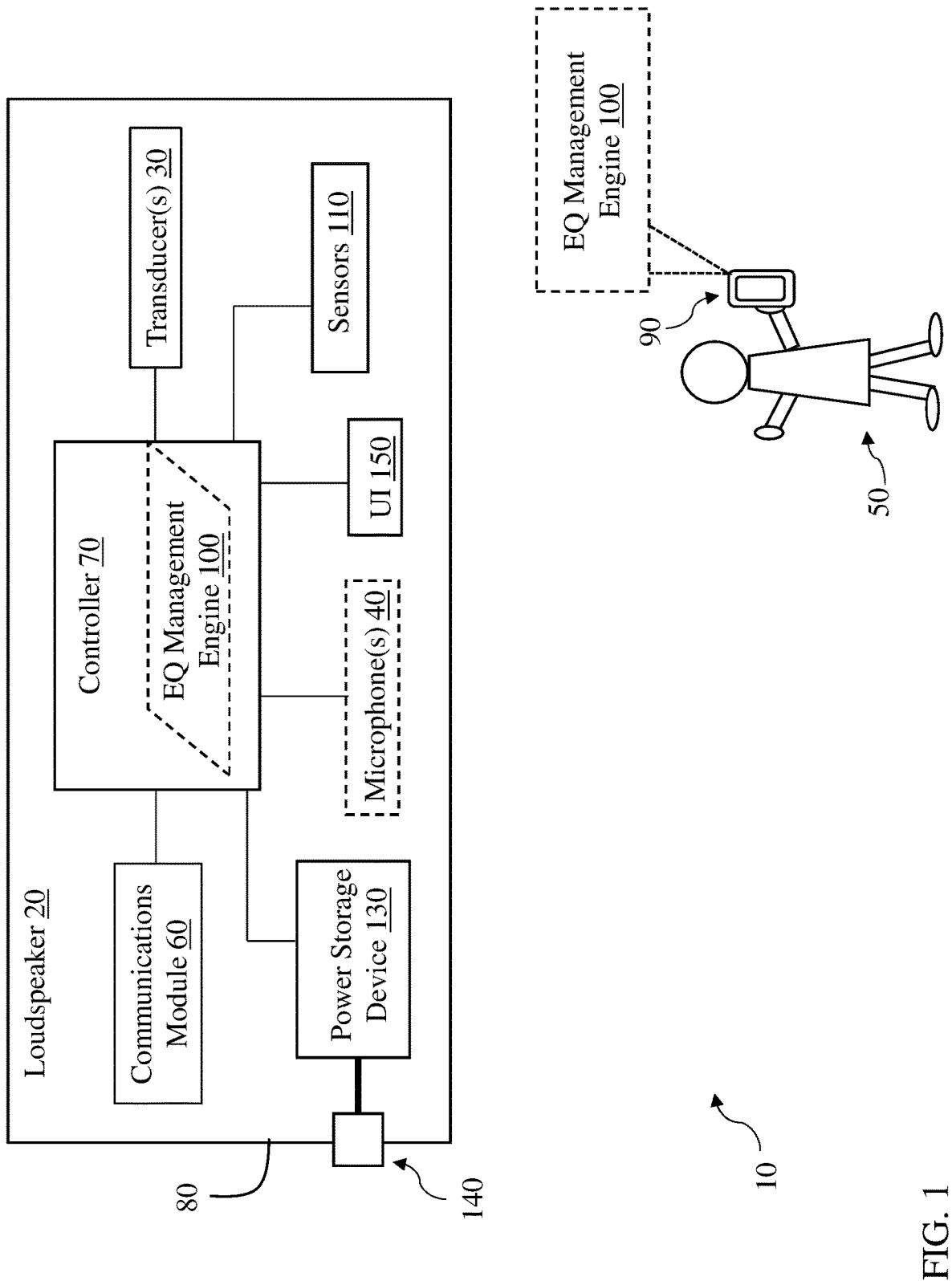
FIG. 1 is a schematic depiction of an environment illustrating a loudspeaker according to various implementations.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure generally relate to portable loudspeakers and related control methods. More particularly, aspects of the disclosure relate to controlling an audio output in a portable loudspeaker based on the loudspeaker's orientation.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/−a margin of error, such as a measurement error.

Aspects and implementations disclosed herein may be applicable to a wide variety of speaker systems, or loudspeakers. In some implementations, a portable loudspeaker such as a smart speaker or hand-held speaker system is disclosed. Certain examples of loudspeakers are described as "portable" loudspeakers, which is to say, these loudspeakers have a power storage device (e.g., a battery) as well as connection for an external power source (e.g., a connection with an external power source such as an alternating current (AC) source). That is, the portable loudspeaker includes a hard-wired power connection, and can also function using stored (e.g., battery) power. Additionally, a portable loudspeaker with "smart" capabilities (e.g., a portable smart loudspeaker) can have local network connectivity (e.g., to a wireless fidelity, or Wi-Fi network), as well as direct device connectivity (e.g., via Bluetooth (BT) communication protocol, or Airplay communication protocol). It should be noted that although specific implementations of loudspeakers primarily serving the purpose of acoustically outputting audio are presented with some degree of detail, such presentations of specific implementations are intended to facilitate understanding through provision of examples and should not be taken as limiting either the scope of disclosure or the scope of claim coverage.

In various cases described herein, the portable loudspeaker includes a set of microphones, which in particular implementations, includes at least one far field microphone. In certain of those implementations, the portable loudspeaker includes a set of microphones that includes a plurality of far field microphones. The far field microphones can enable virtual personal assistant (VPA) functionality, e.g., using any of a number of commercially available VPA systems.

Various particular implementations include portable loudspeakers and related methods of controlling an audio output at a portable loudspeaker. In various implementations, a portable loudspeaker (or simply, speaker) is configured to switch between at least two distinct equalization profiles based on a detected change in the physical orientation of the portable loudspeaker. For example, in some cases, the speaker is configured to switch audio output between at least two distinct equalization profiles in response to detecting a change in the physical orientation of the speaker between two or more physical orientations. In certain cases, the switch between two of the distinct equalization profiles is modified by a hysteresis factor. In additional cases, the switch between two of the distinct equalization profiles is smoothed according to a predefined pattern. In any case, the speaker is configured to adjust equalization of the audio output based on device orientation. These configurations improve the user experience by more closely matching the equalization profile to the current device orientation.

FIG. 1 shows an illustrative physical environment 10 including a portable loudspeaker 20 (e.g., with or without smart device capabilities) according to various implementations. As shown, the loudspeaker 20 can include an acoustic transducer 30 for providing an acoustic output to the environment 10. It is understood that the transducer 30 can include one or more conventional transducers, such as a low frequency (LF) driver (or, woofer) and/or a high frequency (HF) driver (or, tweeter) for audio output to the environment 10. In particular implementations, the loudspeaker 20 has a single transducer 30 for providing an audio output into environment 10.

In certain implementations, as indicated in phantom as optional, the loudspeaker 20 can also include a set of microphones 40. In some implementations, the microphone(s) 40 includes a microphone array including a plurality of microphones. In particular examples, the microphone(s) 40 include at least one far field microphone. In particular cases, the far field microphone(s) are configured to detect and process acoustic signals, in particular, human voice signals, at a distance of at least one meter (or one to two wavelengths) from a user. In these cases, the microphones 40 are configured to receive acoustic signals from the environment 10, such as voice signals from one or more users (one example user 50 shown). The microphone(s) 40 can also be configured to detect ambient acoustic signals within a detectable range of the loudspeaker 20.

The loudspeaker 20 can further include a communications module 60 for communicating with one or more other devices in the environment 10 and/or in a network (e.g., a wireless network). In some cases, the communications module 60 can include a wireless transceiver for communicating with other devices in the environment 10. In other cases, the communications module 60 can communicate with other devices using any conventional hard-wired connection and/or additional communications protocols. In some cases, communications protocol(s) can include local area wireless network communication protocol (e.g., a wireless fidelity (Wi-Fi) protocol using a wireless local area network (WLAN)), a communication protocol such as IEEE 802.11 b/g or 802.11 ac, a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Airplay (and variations), Chromecast (and variations), Z-wave (sub-GHz mesh network), 6LoWPAN (a lightweight IP protocol), LTE protocols, RFID, ultrasonic audio protocols, etc. In additional cases, the communications module 60 can enable the loudspeaker 20 to communicate with a remote server, such as a cloud-based server running an application for managing a virtual personal assistant (VPA) and/or equalization profiles. In various particular implementations, separately housed components in loudspeaker 20 are configured to communicate using one or more conventional wireless transceivers. In certain implementations, as noted herein, the communications module 60 is configured to communicate with other devices and/or a network over both a local area wireless network communication protocol (e.g., Wi-Fi communication protocol) and at least one additional communication protocol (e.g., a direct device communication protocol). The additional communication protocol can include, e.g., Bluetooth or Airplay.

The loudspeaker 20 can further include a controller 70 coupled with the transducer 30, the microphone(s) 40 and the communications module 60. As described herein, the controller 70 can be programmed to control one or more audio output functions, including equalization profiles. The controller 70 can include conventional hardware and/or software components for executing program instructions or code according to processes described herein. For example, controller 70 can include one or more processors, memory, communications pathways between components, and/or one or more logic engines for executing program code. In certain examples, the controller 70 includes a microcontroller or processor having a digital signal processor (DSP), such that acoustic signals from microphone(s) 40, including the far field microphone(s), are converted to digital format by analog to digital converters.

Controller 70 can be coupled with the transducer 30, microphone 40 and/or communications module 60 via any conventional wireless and/or hardwired connection which allows controller 70 to send/receive signals to/from those components and control operation thereof. In various implementations, controller 70, transducer 30, microphone 40 and communications module 60 are collectively housed in a speaker housing 80.

For example, in some implementations, functions of the controller 70 can be managed using a smart device 90 that is connected with the loudspeaker 20 (e.g., via any wireless or hard-wired communications mechanism described herein, including but not limited to Internet-of-Things (IoT) devices and connections). In some cases, the smart device 90 can include hardware and/or software for executing functions of the controller 70 to manage audio output (e.g., equalization profiles, audio playback selection, acoustic settings, etc.) in the loudspeaker 20. In particular cases, the smart device 90 includes a smart phone, tablet computer, smart glasses, smart watch or other wearable smart device, portable computing device, etc. The smart device 90 can have an audio gateway, processing components, and one or more wireless transceivers for communicating with other devices in the environment 10. For example, the wireless transceiver(s) can be used to communicate with the loudspeaker 20, as well as one or more connected smart devices within communications range. The wireless transceivers can also be used to communicate with a server hosting a mobile application that is running on the smart device 90, for example, an equalization (EQ) management engine 100.

The server can include a cloud-based server, a local server or any combination of local and distributed computing components capable of executing functions described herein. In various particular implementations, the server is a cloud-based server configured to host the equalization management engine 100, e.g., running on the smart device 90. According to some implementations, the equalization management engine 100 can be downloaded to the user's smart device 90 in order to enable functions described herein.

In various implementations, sensors 110 located at the loudspeaker 20 and/or the smart device 90 can include at least one orientation sensor that is coupled with the controller 70 for indicating the physical orientation of the loudspeaker 20. In particular implementations, the orientation sensor(s) is physically located at the loudspeaker 20, e.g., in, on or otherwise proximate the housing 80 of the loudspeaker 20. In certain implementations, the orientation sensor is a single orientation sensor. In further implementations, the orientation sensor includes a plurality of orientation sensors. The orientation sensor(s) can include an inertial measurement unit (IMU), an accelerometer, and/or an optical sensor. As described herein, inputs from sensors 110 (e.g., orientation sensor(s)) can contribute to calculating a hysteresis factor for switching between the equalization profiles.

In additional implementations, sensors 110 can gather data about the environment 10 proximate to the loudspeaker 20. For example, the sensors 110 can include a vision system (e.g., an optical tracking system or a camera) for obtaining data to identify the user 50 or another user in the environment 10. The vision system can also be used to detect motion proximate the loudspeaker 20. In other cases, the microphone 40 (which may be included in the sensors 110) can detect ambient noise proximate the loudspeaker 20 (e.g., an ambient SPL), in the form of acoustic signals. The microphone 40 can also detect acoustic signals indicating voice commands from the user 50. In some cases, one or more processing components (e.g., central processing unit(s), digital signal processor(s), etc.), at the loudspeaker 20 and/or smart device 90 can process data from the sensors 110 to provide indicators of user characteristics and/or environmental characteristics to the equalization management engine 100. Additionally, in various implementations, the equalization management engine 100 includes logic for processing data about one or more signals from the sensors 110, as well as user inputs to the loudspeaker 20 and/or smart device 90.

The loudspeaker 20 can also include a power storage device 130 coupled with a power connector 140. The power storage device 130 includes, for example, an on-board battery enabling usage of the loudspeaker 20 while the power connector 140 is not connected with an external power source (e.g., an alternating current (AC) source such as a conventional power outlet). The battery can include any number of rechargeable or single-use batteries commonly used in portable electronic devices.

Figure 2:
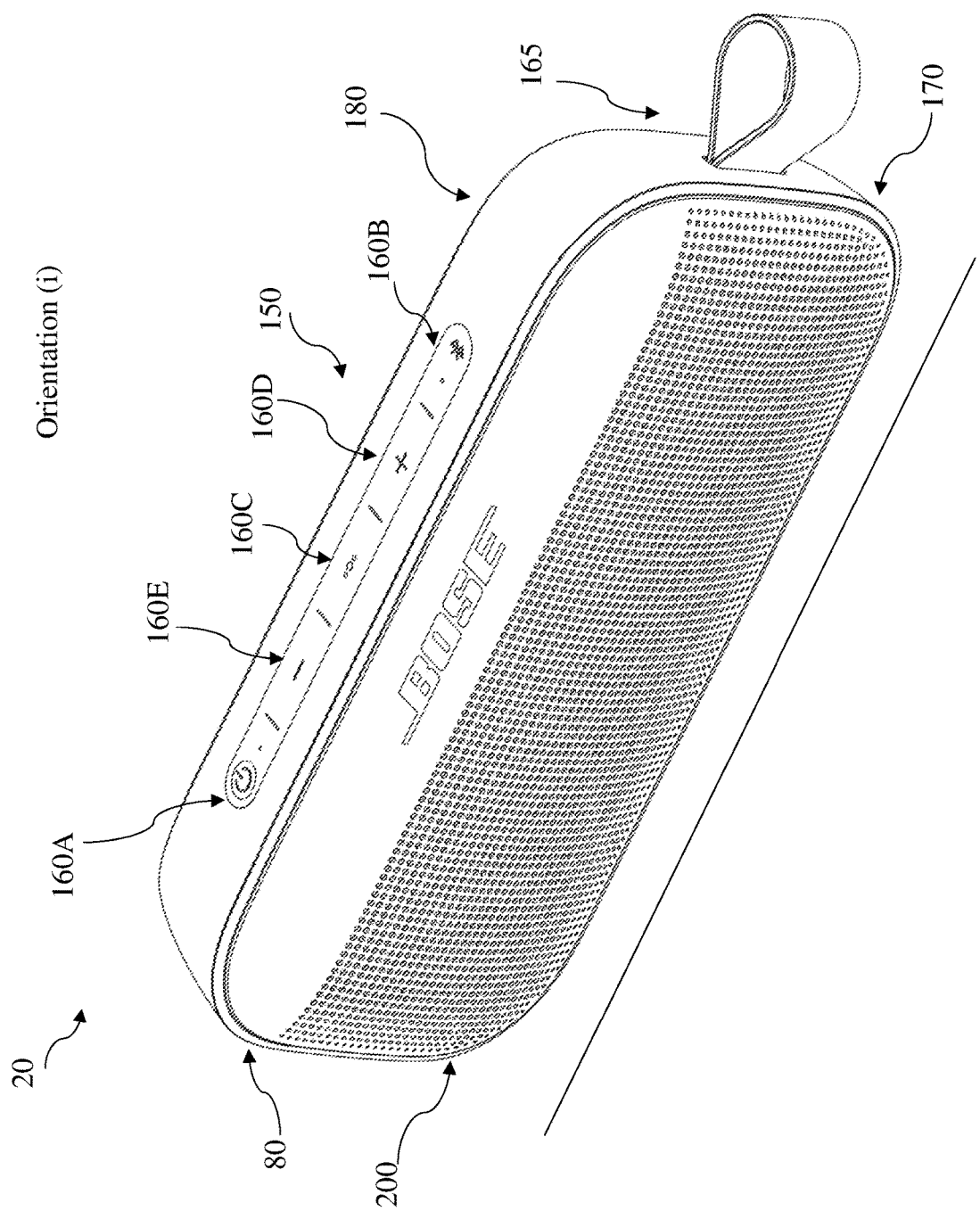
FIG. 2 is a schematic perspective view of the loudspeaker of FIG. 1 in a first orientation, according to various implementations.

In some cases, as shown in FIG. 2, the loudspeaker 20 includes a user interface (UI) 150 including a set of user interface buttons 160 enabling simplified control of functions at the loudspeaker 20. In particular cases, the interface buttons 160 include a power button 160A for powering the loudspeaker 20 on/off. In additional cases, the interface buttons 160 also include and at least one of: a pairing button 160B for controlling an additional communication protocol connection (e.g., BT, or Airplay), at least one of a virtual personal assistant (VPA) button for controlling an active listening mode, a microphone control button for enabling and/or disabling microphones 40, or a multifunction button (MFB) that enables playback control (e.g., play/pause of playback with a tap, skipping playback tracks with a double-press, rebooting with a press-and-hold, etc.), represented in simplified manner as a single button 160C. Volume control buttons 160D and 160E are also illustrated. It is understood that a similar or distinct user interface 150 (not shown) can also be presented on the smart device 90, e.g., via the equalization management engine 100. This user interface 150 can provide the same functions (e.g., buttons 160), or additional functions as those illustrated in the physical user interface in FIG. 2. In some cases, the loudspeaker 20 includes a suspension member 165, which can include a handle, hook, tether, mesh member, cable, etc. that enables suspension of the loudspeaker 20 from a protrusion or hook.

Figure 3:
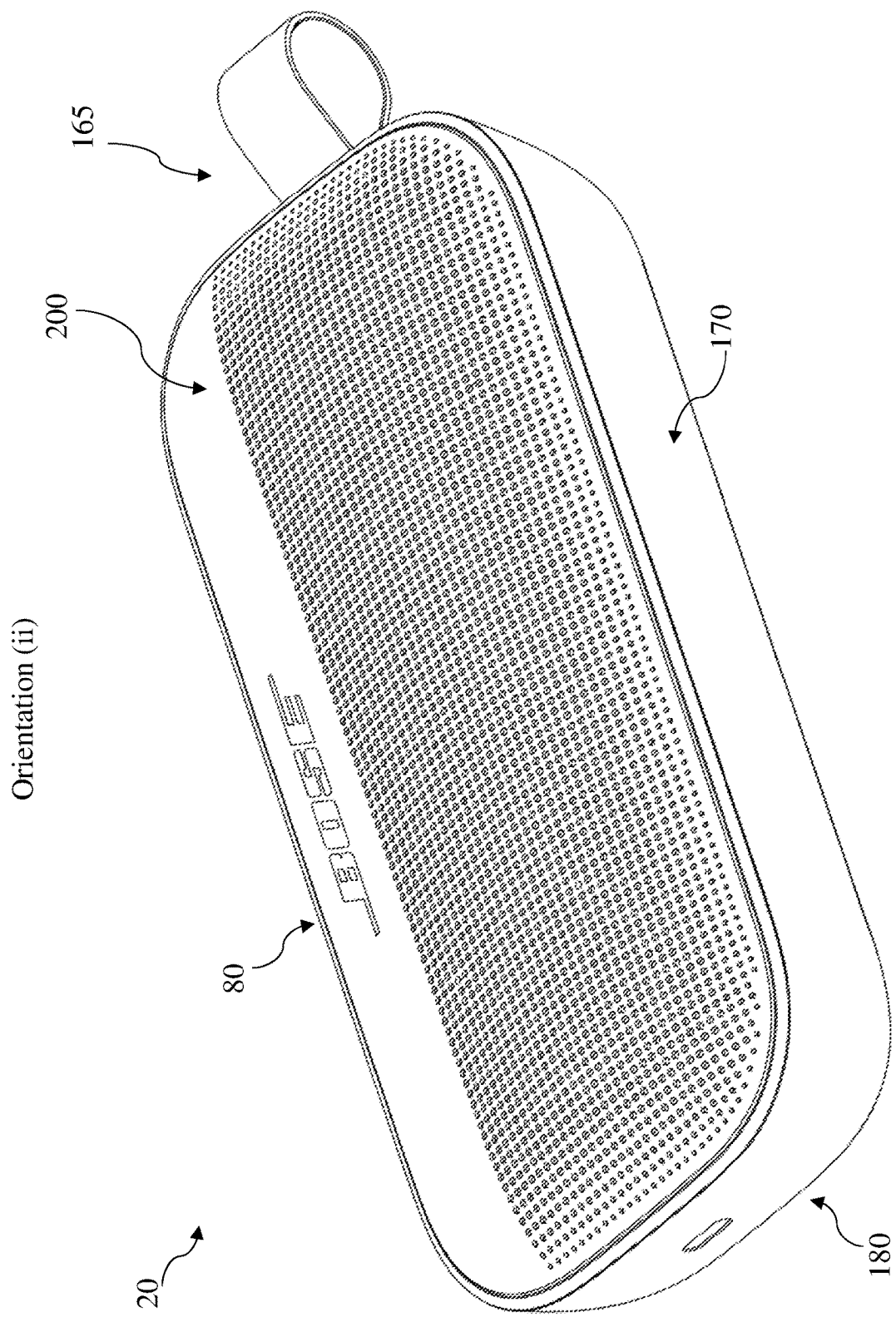
FIG. 3 is a perspective view of the loudspeaker of FIG. 2 in a second orientation, according to various implementations.
Figure 5:
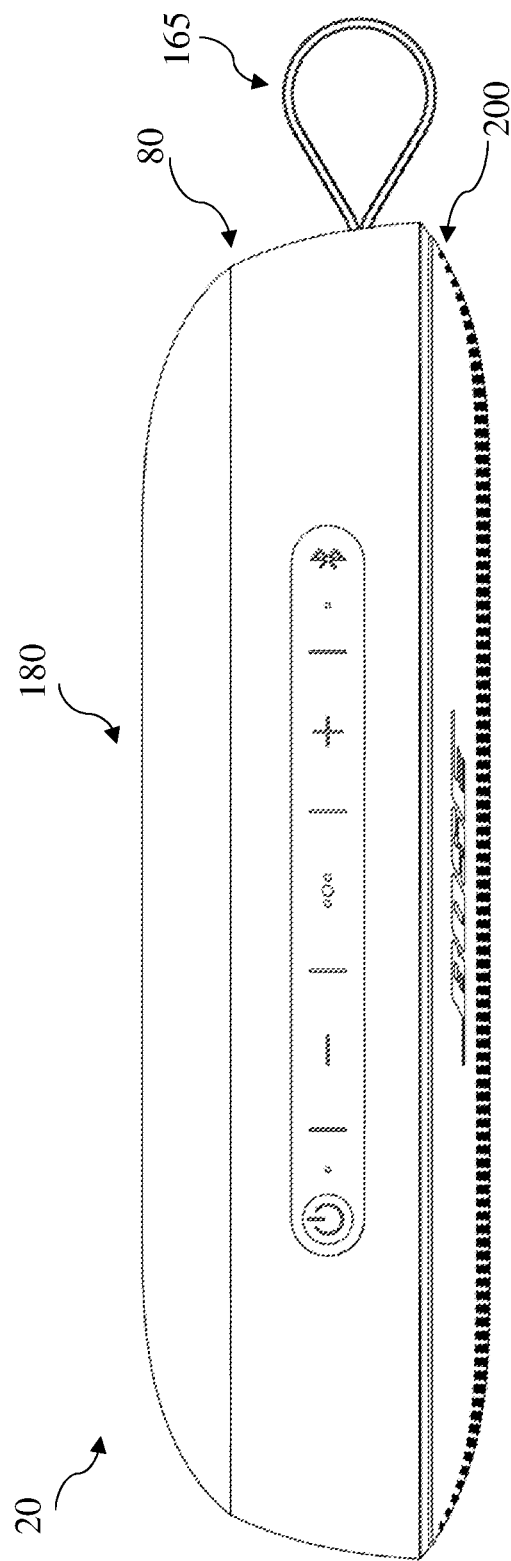
FIG. 5 is a top view of a loudspeaker according to various implementations.
Figure 6:
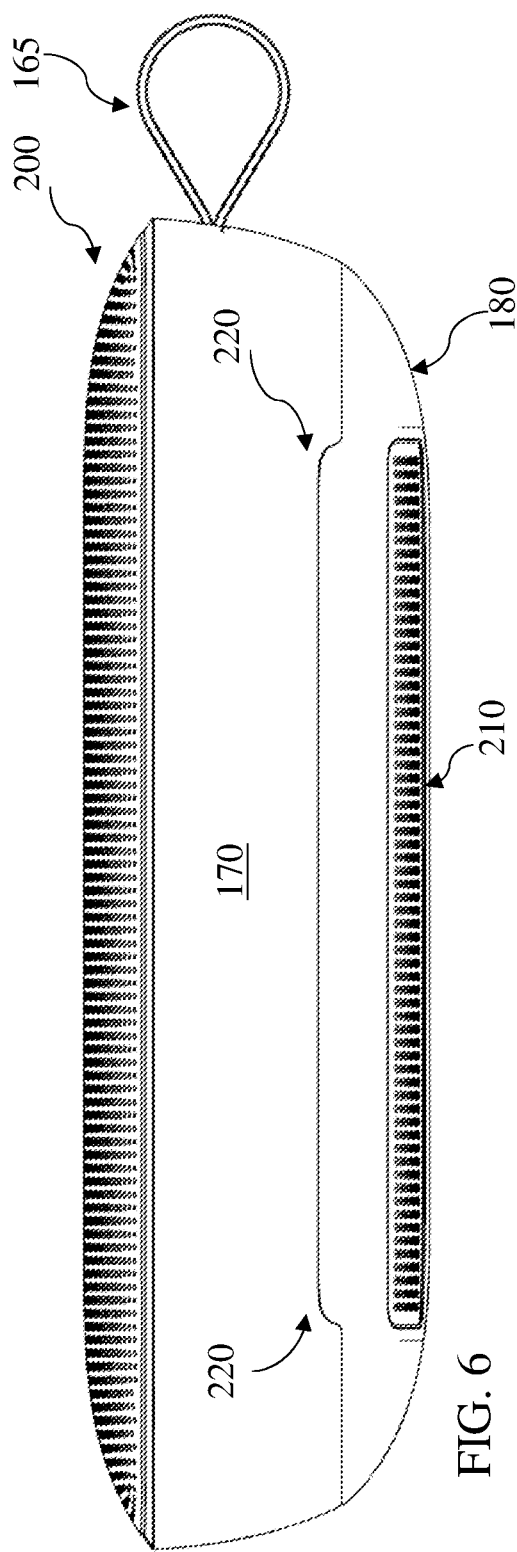
FIG. 6 is a bottom view of the loudspeaker in FIG. 5 according to various implementations.

FIG. 2 illustrates the loudspeaker 20 in a first orientation, e.g., resting on a first side or base 170. FIG. 3 illustrates the loudspeaker 20 in a second, distinct orientation, e.g., resting on a second side 180. In certain implementations, the loudspeaker 20 can include one or more stands for resting on the first side (e.g., base) 170, on the second side 180 and/or on a distinct side. In particular cases, the loudspeaker 20 is configured to be positioned in yet another orientation, e.g., a suspended or hanging orientation (Orientation (iii)) shown in FIG. 4. In this case, the base 170 and second side 180 are not in contact with a surface, e.g., the suspension member 165 is engaged with a protrusion 190 such as a hook or tab that is coupled to a wall or other surface. FIGS. 5 and 6 illustrate top and bottom views, respectively, of the loudspeaker 20, illustrating additional features. In one example, a front grille 200 and a rear grille 210 are also illustrated, where the rear grille is particularly visible in FIG. 6. FIG. 6 also illustrates stands 220, which can include ridges, protrusions, feet, etc. for facilitating resting the base 170 of the loudspeaker 20 on a surface such as a floor, tabletop, or any horizontal or approximately horizontal surface. Similar stands 220 can be located on other portions of the housing, e.g., along second side 180.

Figure 7:
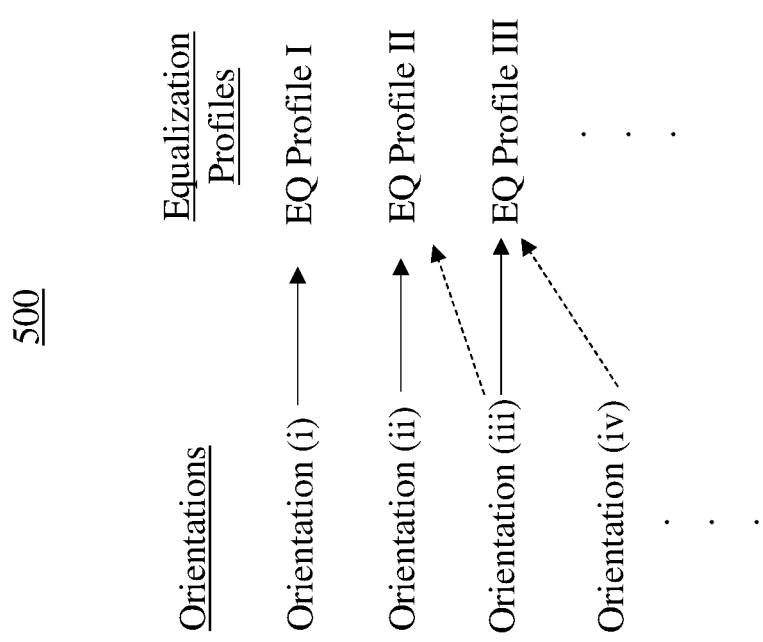
FIG. 7 is a mapping diagram illustrating relationships between equalization profiles and speaker orientations according to various implementations.

FIG. 7 shows a mapping table 500 illustrating example mappings of orientations of the loudspeaker 20 to equalization (EQ) profiles for audio output at the transducer 30 (FIG. 1). With reference to FIGS. 1-6, the equalization management engine 100 manages equalization profiles in order to provide a desirable audio output from the loudspeaker 20 according to the orientation of the loudspeaker 20. In particular example cases, the equalization management engine 100 is configured to control audio output at the transducer(s) 30 according to at least two distinct equalization profiles and in at least two distinct physical orientations.

Figure 4:
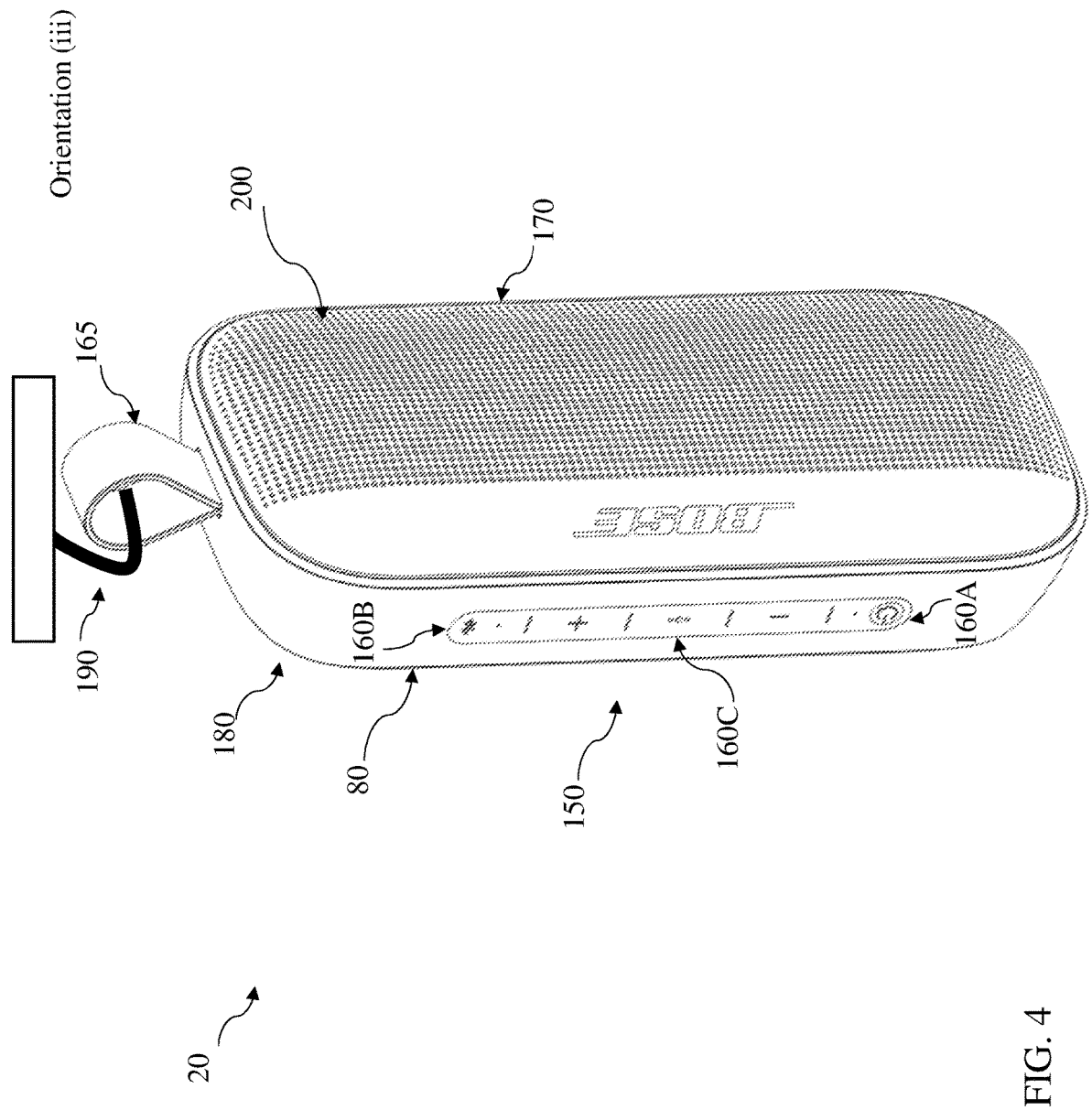
FIG. 4 is a perspective view of the loudspeaker of FIGS. 2 and 3 in a third orientation, according to various implementations.

In the examples depicted in FIGS. 2-4, the equalization management engine 100 is configured to control audio output at the transducer(s) 30 according to at least three (3) distinct equalization (EQ) profiles in at least three orientations (Orientations (i), (ii), and (iii)). In the example mapping table in FIG. 7, each of the Orientations (i), (ii), and (iii) is associated with a distinct EQ profile: EQ Profile I, EQ Profile II, and EQ Profile III, respectively. In various implementations, multiple orientations can be associated with the same EQ profile (e.g., a fourth orientation (Orientation (iv)) being associated with EQ Profile III, or Orientation (iii) being associated with EQ profile II, both illustrated in phantom).

In particular examples, the equalization management engine 100 has only two EQ profiles (e.g., EQ Profile I and EQ Profile II), with a first of the EQ profiles being a primary EQ profile and the second being a secondary EQ profile. In these examples, a majority of orientations are associated with the primary EQ profile, and a minority of orientations are associated with a secondary EQ profile. Even further, in certain cases, the loudspeaker 20 has only two or three practically useful orientations. That is, the loudspeaker 20 can be configured to rest in only two or three positions (e.g., including or excluding a suspended orientation), such that two or three EQ profiles are available to the equalization management engine 100. In these cases, the loudspeaker 20 can be shaped such that it rests on an approximately flat surface in only two or three distinct orientations. In a particular example, the loudspeaker 20 is configured to provide the audio output in three distinct physical orientations (e.g., Orientations (i)-(iii)) according to two distinct equalization profiles (e.g., EQ Profiles I and II).

Equalization profiles can be implemented as digital filters, which filter the incoming digital audio signals. These digital filters can be fully defined by a linear constant coefficient difference equation, and implemented as cascaded second-order sections. In certain cases, these digital filters are fixed for each equalization profile. In particular implementations, the digital filters include biquad filters that are defined by biquad (or, biquadratic) coefficients, which can distinguish a given filter from others. In various example implementations, a first equalization profile (e.g., EQ Profile I) is associated with at least a first orientation (e.g., Orientation (i), also called a "forward-firing" orientation). In some cases, EQ Profile I is also associated with another orientation (e.g., Orientation (iii)). In certain of these cases, EQ profile I is associated with a pass-through biquad filter having a biquad coefficient set of [1 0 0 1 0 0]. In some cases, the pass-through biquad filter has no more than nominal gain or phase impact on the incoming signal. In contrast, a second equalization profile (e.g., EQ Profile II) can be associated with a distinct orientation (e.g., Orientation (ii), also called an "up-firing" orientation). In these cases, EQ Profile II can include a distinct filter with a filter coefficient set that differs (in a non-trivial manner) from the EQ Profile I coefficient set. In any case, the digital filters applied according to each EQ Profile differ, providing distinct audio outputs as described herein.

In a particular example, the change in equalization between profiles (e.g., EQ Profile I versus EQ Profile II) is characterized by a change in equalization at mid-range or upper mid-range, to high frequency bands, e.g., around 1 kHz or higher. In certain cases, the change in equalization between profiles approximately balances compensating for the directivity difference in an anechoic environment and compensating for the radiated power difference in-room. In some examples, the equalization change (e.g., from EQ Profile I to EQ Profile II) is characterized by a rising high-frequency shelf, e.g., of approximately 6 decibels (dB) or so around 10 kHz, with peaks and valleys along the shelf.

Equalization profiles can be switched in response to detecting a change in physical orientation of the portable loudspeaker between two of the physical orientations. As noted herein, the change in orientation can be indicated by one or more orientation sensors (e.g., in sensors 110, FIG. 1). In certain examples, the orientation change is indicated by a signal from an IMU on board the loudspeaker 20. In some implementations, the switch between two of the distinct equalization profiles produces a change in a perceptible radiation pattern of the audio output by the user 50. This can be particularly evident to the user 50 when the orientation of the loudspeaker 20 remains the same during the switch between equalization profiles. That is, in a given orientation, the user 50 will be able to perceive a change in the radiation pattern of the audio output from the loudspeaker 20 when the equalization profiles are switched. In certain implementations, the EQ profiles are selected to provide an approximately consistent perceptible radiation pattern of audio output in the distinct orientations, such that in response to a change in orientation, the equalization management engine 100 switches between EQ profiles to provide at most a minimally perceptible change in radiation pattern for the user 50. That is, the equalization management engine 100 is configured to switch between EQ profiles to provide a desirable radiation pattern of audio output in distinct speaker orientations.

In some examples, the equalization management engine 100 is further configured to adjust an audio output limit based on the switch between two of the distinct equalization profiles. In certain cases, the audio output limit can be adjusted by selecting distinct limiter(s), tuning one or more limiters, or adjusting at least one limiter in a set, such as increasing a high pass limiter relative to a low pass limiter.

As noted herein, in particular cases, the switch between EQ profiles can be either: a) modified by a hysteresis factor, or b) smoothed according to a predefined pattern. These approaches can avoid unintended switching between profiles, e.g., when a user only temporarily reorients the loudspeaker 20 and/or accidentally reorients the loudspeaker 20.

In some implementations, the hysteresis factor includes a time delay between the detected change in physical orientation and the switch between two of the distinct equalization profiles. In particular cases, the time delay is at least 100 milliseconds (ms). In some examples, the time delay is at least: 110 ms, 120 ms, 130 ms, 140 ms, 150 ms, 160 ms, 170 ms, 180 ms, 190 ms or 200 ms. In particular implementations, the EQ management engine 100 includes a machine learning engine that is configured to update the hysteresis factor based on detected changes in physical orientation of the loudspeaker 20 over time. In these cases, the EQ management engine 100 trains the machine learning engine to update the hysteresis factor based on detected changes in physical orientation of the loudspeaker 20 over time. For example, the EQ management engine 100 can increase the time delay in response to detecting a threshold number of false positives and/or rapid switch-backs in orientation.

In some implementations, the EQ management engine 100 is configured to smooth a transition between the distinct equalization profiles according to a predefined pattern. In particular cases, the transition is smoothed using an exponential crossfade function, or a linear crossfade function. In particular examples, the crossfade duration is approximately 5 ms to approximately 35 ms, and in more particular examples is approximately 20 ms+/−5 ms to 10 ms. In these cases, the EQ management engine 100 can avoid or mitigate abrupt changes in equalization profiles using at least one crossfade function.

In certain implementations, the EQ management engine 100 effectively switches between equalization profiles without any discernable loss (or, change) in the quality of the audio output. That is, when operating as designed, the EQ management engine 100 can maintain high quality audio output across a plurality of orientations without abrupt, noticeable switches in audio output. However, in certain cases, it may be desirable to alert the user 50 of a change in equalization profile, e.g., so that the user 50 can appreciate the technical benefits of the loudspeaker 20, and in particular, the EQ management engine 100. In some of these cases, the EQ management engine 100 is configured to provide an indicator to the user 50 of the switch between EQ profiles (e.g., between EQ Profile I and EQ Profile II (FIG. 5). In some examples, the indicator includes at least one of: ducking audio output at the loudspeaker 20, providing a visual indicator at the loudspeaker 20 (e.g., lighting change at the interface 150 and/or a tactile indicator such as a vibration), and/or an interface indicator such as on a connected device or controller (e.g., device 90). Any other indicators such as audible, visual and/or tactile indicators can be used in additional implementations.

While various implementations are described with reference to a single portable loudspeaker 20, in certain cases, at least one of the equalization profiles includes a pairing profile configured for outputting audio while the portable loudspeaker 20 is in a stereo pair of loudspeakers or a stereo grouping of loudspeakers. In particular aspects, the pairing profile causes the EQ management engine 100 to perform spectral matching with the loudspeaker 20 and at least one additional loudspeaker in a stereo pair of the stereo grouping. In additional particular aspects, the pairing profile causes the EQ management engine 100 to perform spectral matching with the loudspeaker 20 and at least one additional loudspeaker in the stereo grouping, such as in a master speaker/worker speaker grouping.

In still further implementations, the EQ management engine 100 is configured to lock the equalization profile in response to a user command such that the equalization profile does not change in response to the detected change in physical orientation of the loudspeaker 20. In these cases, the user 50 may wish to maintain the equalization profile regardless of the loudspeaker orientation. In certain cases, the user 50 may wish to experience the difference in perceived audio output from the speaker 20 in distinct orientations with the same equalization profile.

In even further aspects, the EQ management engine 100 is configured to initiate a demonstration mode, e.g., to demonstrate functions of the orientation-based EQ adjustment. In certain cases, the EQ management engine 100 initiates a demonstration mode by:

I) Prompting a user 50 to modify the physical orientation of the loudspeaker 20;

II(A): in a first mode: enabling the switching between two of the distinct equalization profiles in response to detecting the change in physical orientation of the loudspeaker 20; and II(B): in a second mode: disabling the switching between two of the distinct equalization profiles in response to detecting the change in physical orientation of the loudspeaker 20. In these examples, the radiation pattern of the audio output from the loudspeaker 20 differs sufficiently between the first mode and the second mode to be perceptible to the user 50. That is, the user is likely to perceive an audible difference between the first mode and the second mode, and as such, is likely to appreciate the technical benefits of the orientation-based equalization switching performed by the EQ management engine 100 according to various implementations. Regarding the prompt(s) noted in (I) of the demonstration mode, user prompts can include a user interface (UI) prompt, e.g., a prompt via one or more of: a connected smart device (e.g., device 90), the loudspeaker interface 150, and/or a connected controller interface (e.g., a controller specific to loudspeaker 20).

As noted herein, the equalization management engine 100 is configured to provide an audio output across a consistently desirable EQ profile, regardless of loudspeaker orientation. The equalization management engine 100 can be configured to modify the switch between EQ profiles with a hysteresis factor or modify the switch with a smoothing factor, e.g., to avoid undesired and/or premature switching between EQ profiles. When compared with conventional speaker systems, the adaptive equalization configuration of the equalization management engine 100 enhances the user experience. In various implementations, the equalization management engine 100 has the technical effect of controlling equalization profiles based on detected orientation of a loudspeaker 20.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A portable loudspeaker, comprising:
a controller configured to control an audio output according to at least two distinct equalization profiles and in at least two distinct physical orientations,
wherein the controller is configured to switch between two of the distinct equalization profiles in response to detecting a change in physical orientation of the portable loudspeaker between two of the distinct physical orientations, as modified by a hysteresis factor,
wherein the hysteresis factor includes a time delay between the detected change in physical orientation and the switch between two of the distinct equalization profiles, wherein the time delay is at least 100 milliseconds (ms).

2. The portable loudspeaker of claim 1, further comprising:
a transducer coupled with the controller for providing the audio output; and
at least one orientation sensor coupled with the controller for indicating the physical orientation of the portable loudspeaker.

3. The portable loudspeaker of claim 1, wherein the portable loudspeaker is configured to provide the audio output in three distinct physical orientations according to two distinct equalization profiles.

4. The portable loudspeaker of claim 1, wherein the controller is configured to smooth a transition between the distinct equalization profiles according to a predefined pattern.

5. The portable loudspeaker of claim 1, wherein at least one of the equalization profiles comprises a pairing profile configured for outputting audio while the portable loudspeaker is in a stereo pair of loudspeakers or a stereo grouping of loudspeakers,
wherein the pairing profile causes the controller to perform spectral matching with the portable loudspeaker and at least one additional loudspeaker in the stereo pair or the stereo grouping,
wherein the controller is further configured to provide an indicator to a user of the switch between the distinct equalization profiles.

6. The portable loudspeaker of claim 1, wherein the switch between two of the distinct equalization profiles produces a change in a perceptible radiation pattern of the audio output by a user.

7. The portable loudspeaker of claim 1, wherein the controller is further configured to adjust an audio output limit based on the switch between two of the distinct equalization profiles,
wherein the portable loudspeaker has a single transducer.

8. The portable loudspeaker of claim 1, wherein the controller is configured to lock the equalization profile in response to a user command such that the equalization profile does not change in response to the detected change in physical orientation.

9. The portable loudspeaker of claim 1, wherein the controller is configured to initiate a demonstration mode by:
prompting a user to modify the physical orientation of the portable loudspeaker;

in a first mode: enabling the switching between two of the distinct equalization profiles in response to detecting the change in physical orientation; and in a second mode: disabling the switching between two of the distinct equalization profiles in response to detecting the change in physical orientation, such that a radiation pattern of the audio output differs sufficiently between the first mode and the second mode to be perceptible to the user.

10. A method of controlling an audio output at a portable loudspeaker configured to operate with at least two distinct equalization profiles in at least two distinct physical orientations, the method comprising:

detecting a change in the physical orientation of the portable loudspeaker; and switching between two of the distinct equalization profiles in response to detecting the change in physical orientation of the portable loudspeaker, as modified by a hysteresis factor, wherein the hysteresis factor comprises a time delay between the detected change in physical orientation and the switch between two of the distinct equalization profiles, wherein the time delay is at least 100 milliseconds (ms).

11. The method of claim 10, further comprising smoothing a transition between the distinct equalization profiles according to a predefined pattern.

12. The method of claim 10, wherein the switch between two of the distinct equalization profiles produces a change in a perceptible radiation pattern of the audio output by a user.

13. A portable loudspeaker, comprising:

a controller configured to control an audio output according to at least two distinct equalization profiles and in at least two distinct physical orientations, wherein the controller is configured to switch between two of the distinct equalization profiles in response to detecting a change in physical orientation of the portable loudspeaker between two of the distinct physical orientations, wherein the switch between the two distinct equalization profiles is smoothed according to a predefined pattern.

14. The portable loudspeaker of claim 13, wherein the switch between two of the distinct equalization profiles produces a change in a perceptible radiation pattern of the audio output by a user.

15. A method of controlling an audio output at a portable loudspeaker configured to operate with at least two distinct equalization profiles in at least two distinct physical orientations, the method comprising:

detecting a change in the physical orientation of the portable loudspeaker; and switching between two of the distinct equalization profiles in response to detecting the change in physical orientation of the portable loudspeaker, wherein switching between the two distinct equalization profiles is smoothed according to a predefined pattern.

16. The method of claim 15, wherein switching between two of the distinct equalization profiles produces a change in a perceptible radiation pattern of the audio output by a user.

17. A portable loudspeaker, comprising:

a controller configured to control an audio output according to at least two distinct equalization profiles and in at least two distinct physical orientations, wherein the controller is configured to switch between two of the distinct equalization profiles in response to detecting a change in physical orientation of the portable loudspeaker between two of the distinct physical orientations, as modified by a hysteresis factor, wherein the controller is further configured to adjust an audio output limit based on the switch between two of the distinct equalization profiles.

18. The portable loudspeaker of claim 17, wherein the portable loudspeaker has a single transducer.

19. A method of controlling an audio output at a portable loudspeaker configured to operate with at least two distinct equalization profiles in at least two distinct physical orientations, the method comprising:

detecting a change in the physical orientation of the portable loudspeaker, switching between two of the distinct equalization profiles in response to detecting the change in physical orientation of the portable loudspeaker, and adjusting an audio output limit based on the switch between two of the distinct equalization profiles.

20. The method of claim 19, wherein switching between two of the distinct equalization profiles produces a change in a perceptible radiation pattern of the audio output by a user.

* * * * *